(12) United States Patent
Arico

(10) Patent No.: US 10,843,599 B2
(45) Date of Patent: Nov. 24, 2020

(54) VEHICLE SEAT ASSEMBLY

(71) Applicant: GM GLOBAL TECHNOLOGY OPERATIONS LLC, Detroit, MI (US)

(72) Inventor: Daniel Arico, New Baltimore, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 62 days.

(21) Appl. No.: 16/359,257

(22) Filed: Mar. 20, 2019

(65) Prior Publication Data

US 2020/0298734 A1 Sep. 24, 2020

(51) Int. Cl.
*B60N 2/30* (2006.01)
*B60N 2/20* (2006.01)
*B60N 2/36* (2006.01)
*B60N 2/07* (2006.01)

(52) U.S. Cl.
CPC .......... *B60N 2/3093* (2013.01); *B60N 2/206* (2013.01); *B60N 2/3065* (2013.01); *B60N 2/0707* (2013.01); *B60N 2/36* (2013.01)

(58) Field of Classification Search
CPC ...... B60N 2/3013; B60N 2/3011; B60N 2/36; B60N 2/3065; B60N 2/309; B60N 2/206; B60N 2/0707
See application file for complete search history.

(56) References Cited

U.S. PATENT DOCUMENTS

| | | | |
|---|---|---|---|
| 4,428,611 A | 1/1984 | Widmer | |
| 7,766,430 B2 | 8/2010 | Ventura | |
| 8,096,616 B2 | 1/2012 | Ventura et al. | |
| 8,308,242 B2 | 11/2012 | Hurst, III et al. | |
| 8,585,147 B2 | 11/2013 | Calvert | |
| 9,302,600 B2 | 4/2016 | Zeimis, III et al. | |
| 9,352,670 B2 * | 5/2016 | Zeimis, III | .......... B60N 2/3065 |
| 2007/0046061 A1 * | 3/2007 | Villeminey | .......... B60N 2/3013 |
| | | | 296/65.09 |
| 2014/0062158 A1 * | 3/2014 | Line | ..................... B60N 2/2356 |
| | | | 297/378.1 |

FOREIGN PATENT DOCUMENTS

DE 102013006485 A1 * 11/2013 ............. B60N 2/309
FR 2910398 A3 * 6/2008 ........... B60N 2/3065

* cited by examiner

*Primary Examiner* — Milton Nelson, Jr.

(57) ABSTRACT

A vehicle seat assembly includes a seat back supported by a seat back frame, a seat cushion supported by a seat cushion frame, a forward leg fixed to a vehicle floor and including a slot that slidingly receives a forward portion of the seat cushion frame, a rear leg fixed to the vehicle floor, the seat back frame is pivotally connected to the rear leg, a rear leg linkage pivotally connected to the rear leg and to a rear portion of the seat cushion frame, and a main linkage pivotally connected to the rear leg linkage and the seat back frame.

20 Claims, 5 Drawing Sheets

VEHICLE SEAT ASSEMBLY

FIELD

The present disclosure relates to a vehicle seat assembly.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Vehicle seat assemblies having a seat cushion and a foldable back which can be pivoted downward over the seat cushion to provide a generally horizontal cargo load floor have been available. However, the pivotable linkages enabling the seat back to fold downwardly are quite large and may require a large opening in the seat surface to accommodate the linkage. These existing linkages adversely impact the appearance and are limited in their ability to maximize the cargo area and to truly provide a horizontal load floor surface.

SUMMARY

In an exemplary aspect, a vehicle seat assembly includes a seat back supported by a seat back frame, a seat cushion supported by a seat cushion frame, a forward leg fixed to a vehicle floor and including a slot that slidingly receives a forward portion of the seat cushion frame, a rear leg fixed to the vehicle floor, the seat back frame is pivotally connected to the rear leg, a rear leg linkage pivotally connected to the rear leg and to a rear portion of the seat cushion frame, and a main linkage pivotally connected to the rear leg linkage and the seat back frame.

In another exemplary aspect, the slot in the forward leg is angled upward and back such that the forward portion of the seat cushion frame is moved upward when moved backward.

In another exemplary aspect, the slot in the forward leg further includes a horizontal landing portion at an upper portion.

In another exemplary aspect, the pivotal connection between the seat back frame and the main linkage is below the pivotal connection between the seat back frame and the rear leg when in a seat back upright configuration.

In another exemplary aspect, the pivotal connection between the seat back frame and the main linkage is positioned to the rear of the pivotal connection between the seat back frame and the rear leg when in a fold flat configuration.

In another exemplary aspect, the pivotal connection between the seat cushion frame and the rear leg linkage is positioned forward relative to the pivotal connection between the rear leg linkage and the rear leg when in a fold flat configuration.

In another exemplary aspect, the pivotal connection between the seat cushion frame and the rear leg linkage is positioned above the pivotal connection between the rear leg linkage and the rear leg when in a fold flat configuration.

In another exemplary aspect, the pivotal connection between the rear leg linkage and the main linkage is positioned to the rear of the pivotal connection between the rear leg linkage and the rear leg when in a fold flat configuration.

In another exemplary aspect, the pivotal connection between the rear leg linkage and the main linkage is positioned below the pivotal connection between the rear leg linkage and the rear leg when in a seat back upright configuration.

In another exemplary aspect, the vehicle seat assembly further includes a hook pivotally connected to the seat back frame at a proximal extent.

In another exemplary aspect, a distal extent of the hook extends forward.

In another exemplary aspect, the hook is pivotally connected to the seat back frame at the same location on the seat back frame as the pivotal connection between the seat back frame and the main linkage.

In another exemplary aspect, a distal end of the hook engages the pivotal connection between the seat cushion frame and the rear leg linkage when in a seat back upright configuration.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
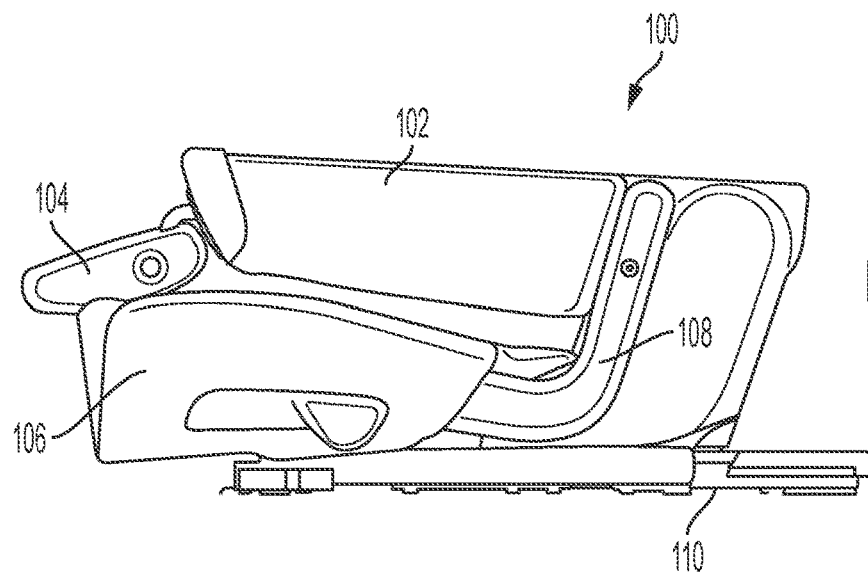
FIG. 1 is a side elevation view of a conventional vehicle seat assembly in a seat back fold flat configuration.

Reference will now be made in detail to several examples of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Figure 2:
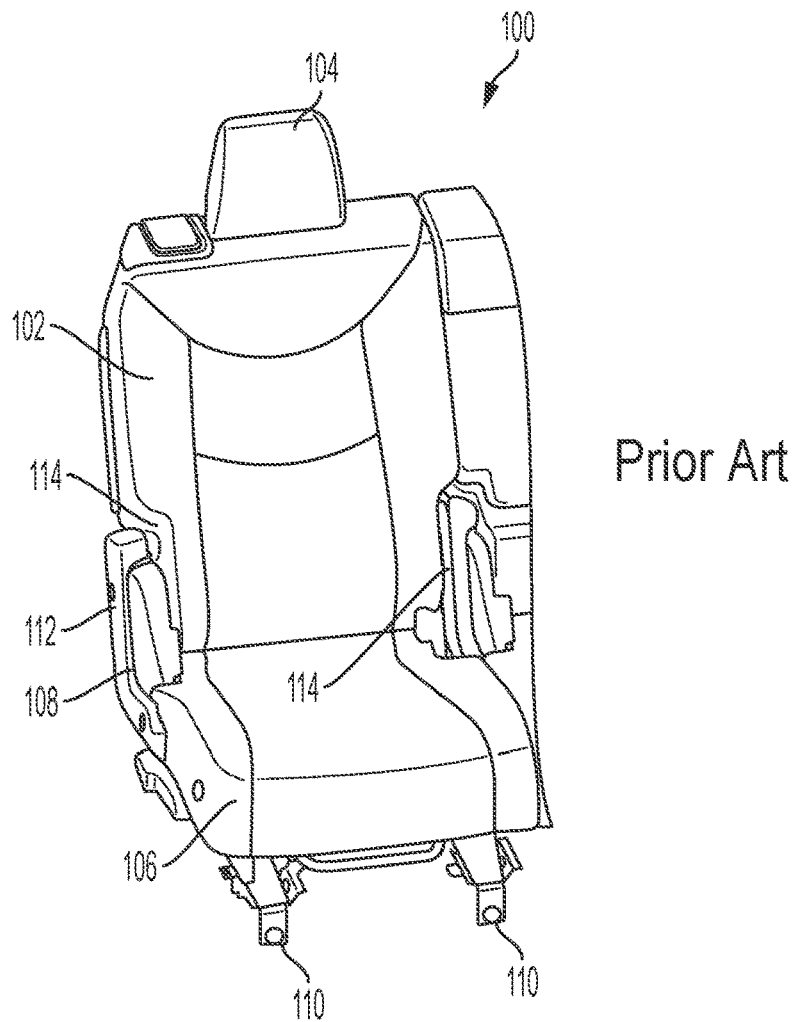
FIG. 2 is a perspective view of the vehicle seat assembly of FIG. 1 in a seat back upright configuration.

Referring now to the drawings, wherein like reference numbers correspond to like or similar components throughout the several figures, FIG. 1 is a side elevation view of a conventional vehicle seat assembly 100 in a seat back fold flat configuration. The seat assembly 100 includes a seat back 102, a head rest 104 attached to the seat back 102, and a seat cushion 106. The seat back 102 is pivotally attached to the seat cushion 106 via a linkage system 108. The seat cushion 106 and the seat back 102 are also slidably connected to a vehicle floor by a seat track 110. In general, the seat assembly 100 moves from a seat back upright configuration (as illustrated in FIG. 2) to the seat back fold flat configuration (as illustrated in FIG. 1) by pivoting the seat back 102 forward and downward. During this transition, the linkage system 108 may also cause the seat cushion 106 to move down and forward slightly. As may be easily seen in FIG. 1, the top surface of the seat back 102 is not completely horizontal. The head rest 104 and/or seat back bolsters (not shown) may limit the ability of the seat back 102 to provide a completely horizontal top surface as a load floor in the fold flat configuration.

FIG. 2 provides a perspective view of the vehicle seat assembly 100 in a seat back upright configuration. In order to protect a vehicle occupant from contacting the linkage system 108, the vehicle seat assembly 100 includes a plastic linkage cover 112. Additionally, as clearly illustrated in FIG. 2, both the seat back 102 and the seat cushion 106 must include large openings 114 to accommodate the linkage system 108 and the linkage cover 112. The large size of the linkage system 108, the linkage cover 112, and seat back and seat cushion openings 114 adversely impact the appearance of the vehicle seat assembly, and limit the space available for an occupant and/or cargo within the vehicle.

Figure 3:
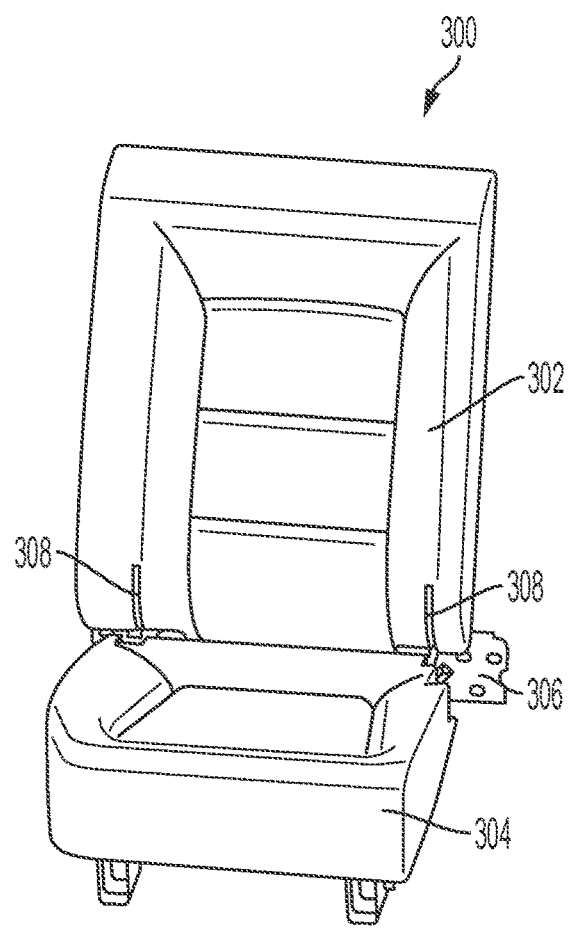
FIG. 3 is a perspective view of an exemplary vehicle seat assembly in a seat back upright configuration in accordance with the present disclosure.
Figure 4:
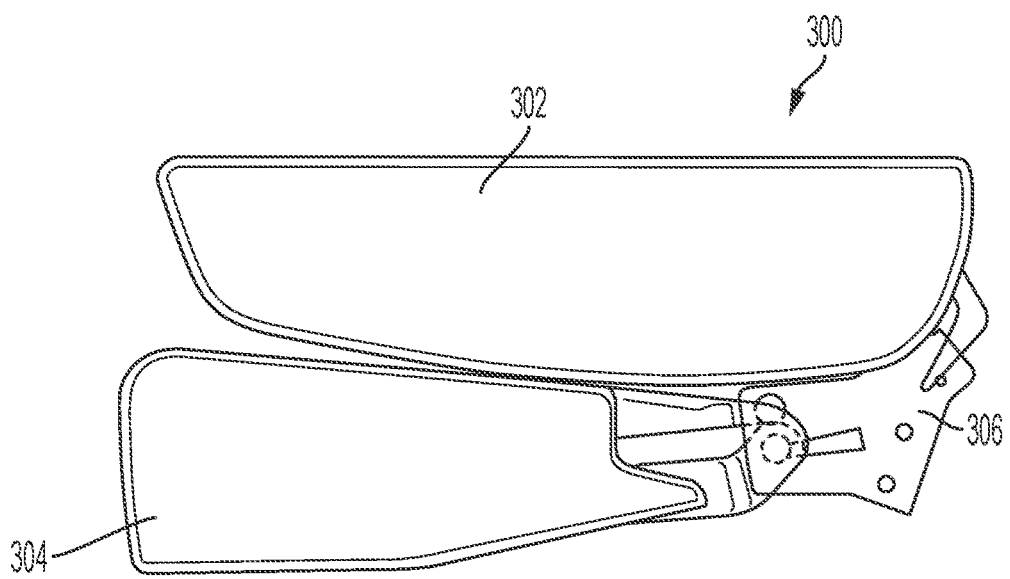
FIG. 4 is a side elevation view of the vehicle seat assembly of FIG. 3 in a seat back fold flat configuration.

FIG. 3 is a perspective view of an exemplary vehicle seat assembly 300 in a seat back upright configuration in accordance with the present disclosure and FIG. 4 is a side elevation view of the seat assembly 300 in a fold flat configuration. The seat assembly 300 includes a seat back 302, a seat cushion 304, and a linkage system 306 pivotally connecting the seat back 302 to the seat cushion 304 and also to a vehicle floor. As is clearly illustrated in FIG. 3, the seat back 302 includes openings 308 which are much smaller than that of conventional seat assemblies which improves the aesthetics and flexibility of design. The smaller openings 308 are enabled because the linkage system 306 of the present disclosure is much smaller than that of conventional seat assemblies. Additionally, FIG. 4 clearly illustrates that the back surface of the seat back 302 provides a completely horizontal load surface, in stark contrast, to the seat back 102 of a conventional vehicle seat assembly.

Figure 5:
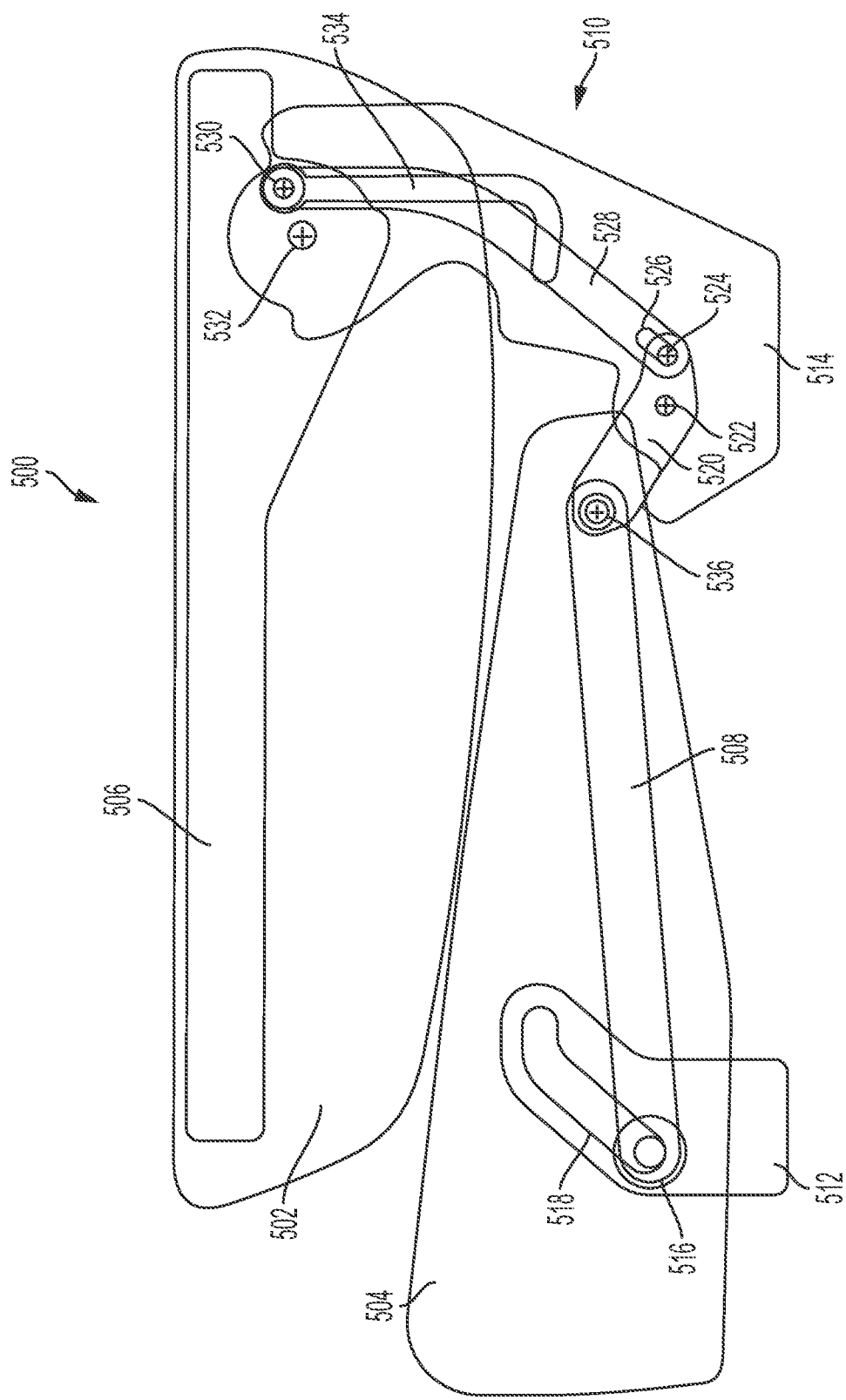
FIG. 5 is a schematic side elevation of an exemplary vehicle seat assembly in accordance with an exemplary embodiment of the present invention in a seat back fold flat configuration.
Figure 6:
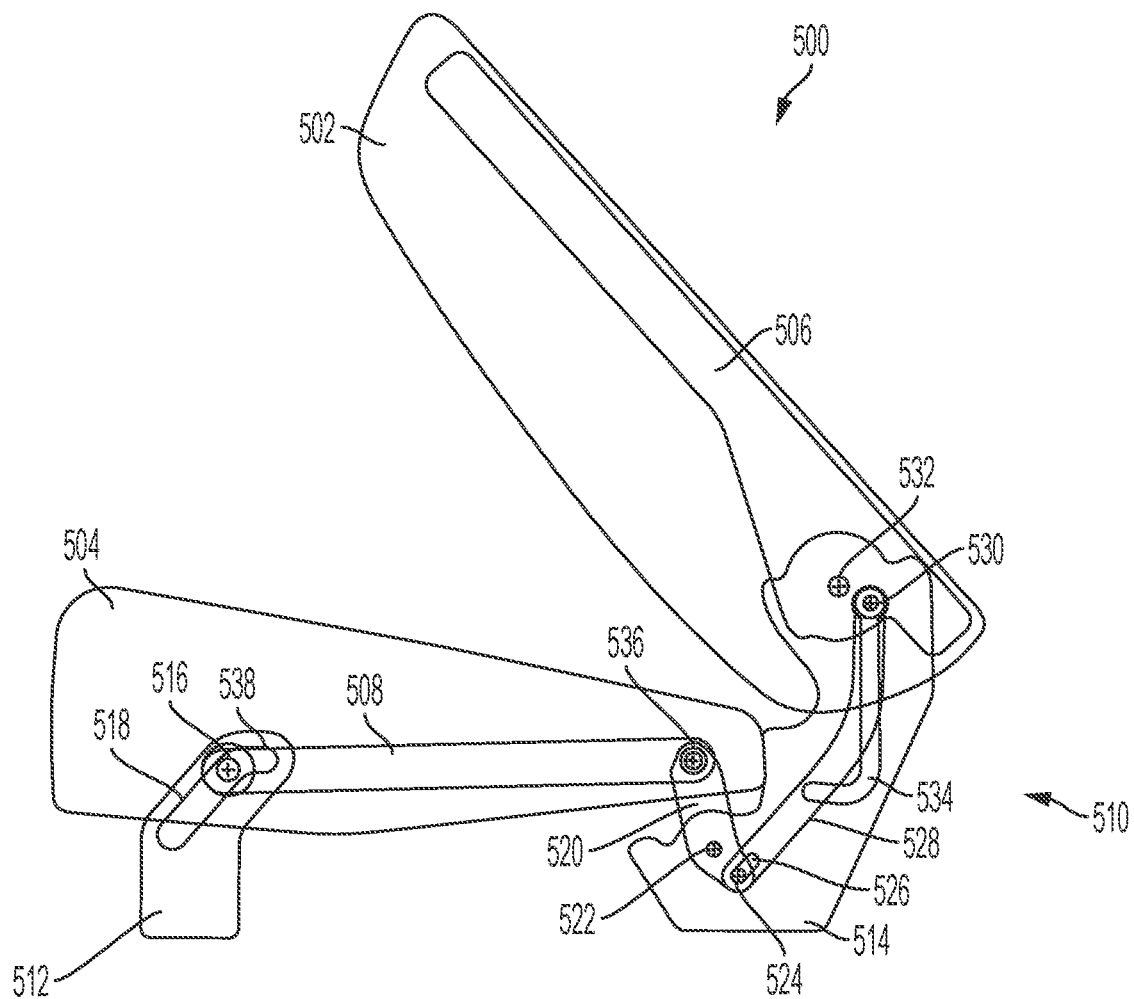
FIG. 6 is a schematic side elevation of the vehicle seat assembly of FIG. 5 in an intermediate configuration between the seat back fold flat configuration and a seat back upright configuration.
Figure 7:
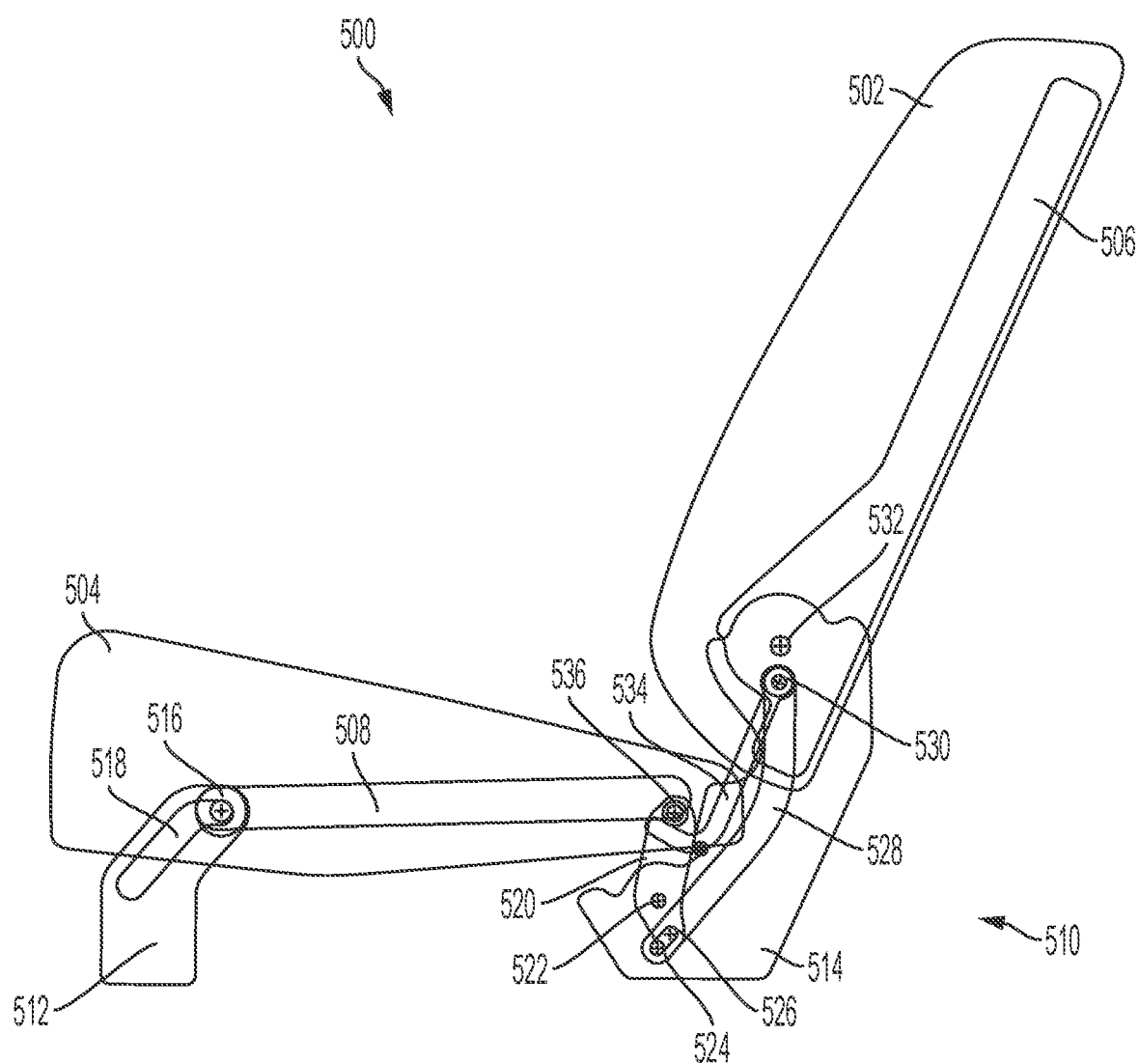
FIG. 7 illustrates the vehicle seat assembly of FIGS. 5 and 6 in a seat back upright configuration.

FIGS. 5-7 provide schematic, side elevation views of an exemplary embodiment of a vehicle seat assembly 500 of the present disclosure in varying configurations and showing the progression between a seat back fold flat configuration (FIG. 5) to a seat back upright configuration (FIG. 7) and an intermediate configuration (FIG. 6) between the fold flat and upright configurations. The vehicle seat assembly 500 includes a seat back 502 and a seat cushion 504. The seat back 502 is supported by a seat back frame 506 and the seat cushion 504 is supported by a seat cushion frame 508. The seat back frame 506 and the seat cushion frame 508 are pivotally connected to each other and a vehicle floor (not shown) through a linkage system 510. The linkage system 510 includes a front leg 512 and a rear leg 514 that are each fixed to the vehicle floor. The seat cushion frame 508 also forms a portion of the linkage system 510 and is connected to the front leg 512 by a front bushing 516. The front bushing 516 slidably engages with a front leg slot 518 in the front leg 512. The seat cushion frame 508 is also pivotally connected to a rear leg linkage 520. The rear leg linkage 520 is pivotally connected to the rear leg 514 at rear pivot 522. The rear leg linkage 520 further includes a bushing 524 that engages a slot 526 in a main linkage 528. The main linkage 528 is pivotally connected to the seat back frame 506 at pivot point 530. The seat back frame 506 is pivotally connected to the rear leg 514 at seat back pivot point 532. The linkage system 510 further includes a hook 534 that is also pivotally connected to the seat back frame 506 at pivot point 530. The hook 534 may freely pivot about pivot point 530 and hangs downwardly under the pull of gravity.

Operation of the vehicle seat assembly 500 will now be described with reference to FIGS. 5-7. The operation of the linkage assembly 510 is controlled by moving the seat back 502 between the fold flat configuration illustrated in FIG. 5, through the intermediate configuration illustrated in FIG. 6, to the seat back upright configuration illustrated in FIG. 7, and vice-versa. It is to be understood that the motion of the seat back 502 may also be held in a configuration, such as, for example, the upright configuration illustrated in FIG. 7, with a conventional seat back latch mechanism (not shown).

In order to transition from the fold flat configuration of FIG. 5 to the upright configuration of FIG. 7, a user may grasp the seat back 502 and lift the seat back 502 upwardly such that the seat back 502 pivots about the pivot point 532. As the seat back frame 506 pivots about the pivot point 532, the pivot point 530 rotates downwardly about the pivot point 532. Downward rotation of the pivot point 530 moves the main linkage 528 downward. As the main linkage 528 moves downward, the bushing 524 on the rear leg linkage 520 travels through the slot 526 until contacting the end of the slot 526. When the bushing 524 contacts the end of the slot 526 and, as the main linkage 528 continues to move downward, the main linkage 528 causes the rear leg linkage 520 to rotate about the rear pivot 522. As the rear leg linkage 520 rotates about the rear pivot 522, a rear frame pivot 536 that connects the rear frame 508 to the rear leg linkage 520 rotates backward and upward about the rear pivot 522. As the seat cushion frame 508 moves backward, the front bushing 516 travels upward and rearward within the front leg slot 518. The front leg slot 518 extends upward and rearward to a top landing portion 538 and, therefore, determines the upward and rearward motion of the front bushing 516 as the seat cushion frame 508 moves rearward. Transition of the vehicle seat assembly 500 from the seat back upright configuration illustrated in FIG. 7 to the fold flat configuration illustrated in FIG. 5 is simply the reverse of this process.

The exemplary vehicle seat assembly 500 includes a hook 528 that is pivotally attached at pivot point 530 to the seat back frame 506. Generally, the hook 528 swings freely downward from the pivot point 530 under the pull of gravity. The hook 528 includes a forwardly extending lower portion that selectively engages the rear frame pivot 536 when the vehicle seat assembly is in the seat back upright configuration. In the upright configuration, the engagement of the hook 528 with the rear frame pivot 536 firmly holds the rear frame pivot 536 in a fixed position. In this manner, the seat cushion 504 is firmly held in position and any slight movement is significantly reduced and/or completely eliminated. With the exemplary vehicle seat assembly 500, when the seat back 502 is rotated downward and forward, the hook 528 releases the rear frame pivot 536 from being fixed in position.

With the exemplary linkage system 510, the seat cushion 504 is lowered and moves forward when the seat back 502 is rotated downward. The forward leg 512 of the linkage system 510 includes a slot 518 that is angled downward and forward which causes the forward end 516 of the seat cushion frame 508 to move downward when moved forward. Further, the linkage system 510 includes a rear leg linkage 520 that is pivotally connected to a rear leg 514 at a central pivot point 522 and that is also pivotally connected to a rear portion of the seat cushion frame 508 at a pivot point 536 that is positioned forward and upward from the central pivot point 522 when in the fold flat configuration and a generally above the central pivot point 522 when in a seat back upright configuration. In this manner, the rear portion of the seat cushion 504 also moves downward and forward when the seat back 502 is rotated from the seat back upright configuration to the fold flat configuration.

The seat back frame 506 and the rear leg linkage 520 are both pivotally attached to the rear leg 514. The main linkage 528 of the linkage system 510 is pivotally connected at a lower extent to the rear leg linkage 520 at a lower pivot point 524 and is also pivotally connected at an upper extent to the seat back frame 506 at an upper pivot point 530. Both the lower pivot point 524 and the upper pivot point 530 are generally positioned to the rear of the correspondingly closest rear leg pivot point when in the fold flat configuration. Further, both the lower pivot point 524 and the upper pivot point 530 are generally positioned below the closest corresponding rear leg pivot point when in the seat back upright configuration.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A vehicle seat assembly comprising:
    a seat back supported by a seat back frame;
    a seat cushion supported by a seat cushion frame;
    a forward leg fixed to a vehicle floor and including a slot that slidingly receives a forward portion of the seat cushion frame;
    a rear leg fixed to the vehicle floor, wherein the seat back frame is pivotally connected to the rear leg;
    a rear leg linkage pivotally connected to the rear leg and to a rear portion of the seat cushion frame; and
    a main linkage pivotally connected to the rear leg linkage and the seat back frame.

2. The vehicle seat assembly of claim 1, wherein the slot in the forward leg is angled upward and back such that the forward portion of the seat cushion frame is moved upward when moved backward.

3. The vehicle seat assembly of claim 2, wherein the slot in the forward leg further includes a horizontal landing portion at an upper portion.

4. The vehicle seat assembly of claim 1, wherein the pivotal connection between the seat back frame and the main linkage is below the pivotal connection between the seat back frame and the rear leg when in a seat back upright configuration.

5. The vehicle seat assembly of claim 1, wherein the pivotal connection between the seat back frame and the main linkage is positioned to the rear of the pivotal connection between the seat back frame and the rear leg when in a fold flat configuration.

6. The vehicle seat assembly of claim 1, wherein the pivotal connection between the seat cushion frame and the rear leg linkage is positioned forward relative to the pivotal connection between the rear leg linkage and the rear leg when in a fold flat configuration.

7. The vehicle seat assembly of claim 1, wherein the pivotal connection between the seat cushion frame and the rear leg linkage is positioned above the pivotal connection between the rear leg linkage and the rear leg when in a fold flat configuration.

8. The vehicle seat assembly of claim 1, wherein the pivotal connection between the rear leg linkage and the main linkage is positioned to the rear of the pivotal connection between the rear leg linkage and the rear leg when in a fold flat configuration.

9. The vehicle seat assembly of claim 1, wherein the pivotal connection between the rear leg linkage and the main linkage is positioned below the pivotal connection between the rear leg linkage and the rear leg when in a seat back upright configuration.

10. The vehicle seat assembly of claim 1, further comprising a hook pivotally connected to the seat back frame at a proximal extent.

11. The vehicle seat assembly of claim 10, wherein a distal extent of the hook extends forward.

12. The vehicle seat assembly of claim 10, wherein the hook is pivotally connected to the seat back frame at the same location on the seat back frame as the pivotal connection between the seat back frame and the main linkage.

13. The vehicle seat assembly of claim 10, wherein a distal end of the hook engages the pivotal connection between the seat cushion frame and the rear leg linkage when in a seat back upright configuration.

14. A vehicle with a vehicle seat assembly comprising:
    a seat back supported by a seat back frame;
    a seat cushion supported by a seat cushion frame;
    a forward leg fixed to a vehicle floor and including a slot that slidingly receives a forward portion of the seat cushion frame;
    a rear leg fixed to the vehicle floor, wherein the seat back frame is pivotally connected to the rear leg;
    a rear leg linkage pivotally connected to the rear leg and to a rear portion of the seat cushion frame; and
    a main linkage pivotally connected to the rear leg linkage and the seat back frame.

15. The vehicle seat assembly of claim 14, wherein the slot in the forward leg is angled upward and back such that the forward portion of the seat cushion frame is moved upward when moved backward.

16. The vehicle seat assembly of claim 15, wherein the slot in the forward leg further includes a horizontal landing portion at an upper portion.

17. The vehicle seat assembly of claim 14, wherein the pivotal connection between the seat back frame and the main linkage is below the pivotal connection between the seat back frame and the rear leg when in a seat back upright configuration, and wherein the pivotal connection between the seat back frame and the main linkage is positioned to the rear of the pivotal connection between the seat back frame and the rear leg when in a fold flat configuration.

18. The vehicle seat assembly of claim 14, wherein the pivotal connection between the seat cushion frame and the rear leg linkage is positioned forward relative to the pivotal connection between the rear leg linkage and the rear leg when in a fold flat configuration, and wherein the pivotal connection between the seat cushion frame and the rear leg linkage is positioned above the pivotal connection between the rear leg linkage and the rear leg when in a fold flat configuration.

19. The vehicle seat assembly of claim 14, wherein the pivotal connection between the rear leg linkage and the main linkage is positioned to the rear of the pivotal connection between the rear leg linkage and the rear leg when in a fold flat configuration.

20. The vehicle seat assembly of claim 14, wherein the pivotal connection between the rear leg linkage and the main linkage is positioned below the pivotal connection between the rear leg linkage and the rear leg when in a seat back upright configuration.

* * * * *